United States Patent
Lee (10) Patent No.: US 10,602,018 B2
(45) Date of Patent: Mar. 24, 2020

(54) IMAGE TRANSMISSION METHOD AND SYSTEM THEREOF AND IMAGE TRANSMISSION APPARATUS

(71) Applicant: Eagle Vision Tech Limited., Taipei (TW)

(72) Inventor: Sywe-Neng Lee, Taipei (TW)

(73) Assignee: Eagle Vision Tech Limited., Taipei (TW)

( * ) Notice: Subject to any disclaimer, the term of this patent is extended or adjusted under 35 U.S.C. 154(b) by 0 days.

(21) Appl. No.: 16/172,855

(22) Filed: Oct. 28, 2018

(65) Prior Publication Data

US 2019/0356814 A1    Nov. 21, 2019

(30) Foreign Application Priority Data

May 16, 2018  (TW) .............................. 107116547 A (51) Int. Cl.
*H04N 1/387* (2006.01)
*H04N 1/00* (2006.01)

(52) U.S. Cl.
CPC ......... *H04N 1/3876* (2013.01); *H04N 1/0001* (2013.01); *H04N 1/00222* (2013.01)

(58) Field of Classification Search
CPC . H04N 1/3876; H04N 1/0001; H04N 1/00222
USPC ................ 358/450, 452, 453, 448, 1.9, 1.15
See application file for complete search history.

(56) References Cited

U.S. PATENT DOCUMENTS

| 7,505,633 B2 * | 3/2009 | Kitajima ................. G06T 5/006 |
| | | 358/450 |
| 2008/0267589 A1 | 10/2008 | Turner et al. |
| 2013/0027757 A1 * | 1/2013 | Lee ........................ H04N 1/387 |
| | | 358/450 |

FOREIGN PATENT DOCUMENTS

| CN | 102263943 | 11/2011 |
| CN | 107333119 | 11/2017 |
| TW | 200818911 | 4/2008 |
| TW | 201440514 | 10/2014 |
| TW | I502957 | 10/2015 |
| TW | I615022 | 2/2018 |

OTHER PUBLICATIONS

"Office Action of Taiwan Counterpart Application", dated May 17, 2019, pp. 1-9.

* cited by examiner

*Primary Examiner* — Quang N Vo
(74) *Attorney, Agent, or Firm* — JCIPRNET (57) ABSTRACT

An image transmission method and a system thereof and an image transmission apparatus are provided. The method includes: determining an estimated distortion area of at least one first image; zooming out the first image to generate a second image according to the estimated distortion area; adding the estimated distortion area around the second image to generate a transmission image and filling a transmission pattern in the estimated distortion area of the transmission image, wherein a resolution of the transmission image is equal to that of the first image; and transmitting the transmission image through at least one channel.

14 Claims, 9 Drawing Sheets

IMAGE TRANSMISSION METHOD AND SYSTEM THEREOF AND IMAGE TRANSMISSION APPARATUS

CROSS-REFERENCE TO RELATED APPLICATION

This application claims the priority benefit of Taiwan application serial no. 107116547, filed on May 16, 2018. The entirety of the above-mentioned patent application is hereby incorporated by reference herein and made a part of this specification.

BACKGROUND

Technical Field

The disclosure relates to a signal transmission technology, and particularly relates to an image transmission method and a system thereof and an image transmission apparatus.

Description of Related Art

With the advance of image processing technologies, image signal transmission has become one of the commonly used techniques in daily life. For example, a monitoring system transmits the captured image to a display apparatus in real time to synchronously display the captured image, or transmits the captured image to a storage device to synchronously record the captured image.

In general, when an image signal is transmitted, due to environmental factors (such as effects of the transmission channel), edges of the transmitted image may be distorted. The range of the aforesaid distortion is related to the channel medium or digital signal processing capabilities.

Figure 1:
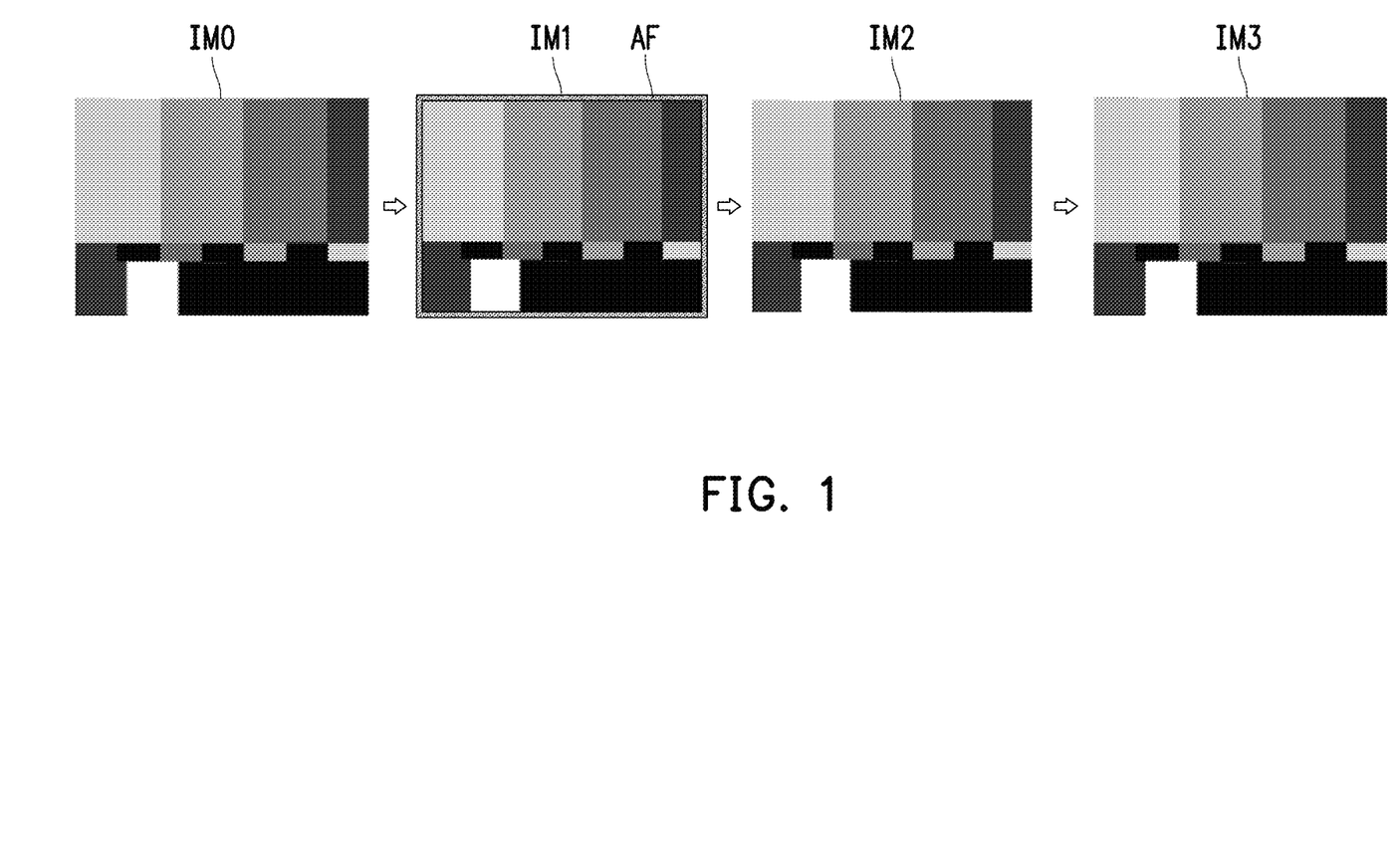
FIG. 1 is a schematic view showing an image transmission process.

FIG. 1 shows a commonly seen image transmission technology at present. As shown in FIG. 1, an image IM0 is an original image to be transmitted by a transmission apparatus, and an image IM1 is an image received by a receiving apparatus after the image is transmitted through a channel. As can be seen from FIG. 1, a distorted area AF may appear around edges of the image IM1. Accordingly, the receiving apparatus cuts off the distorted area AF of the image IM1 to obtain an image IM2 that is unaffected by the distortion, and then the image IM2 is zoomed in and compensated, so that a display image IM3 that has the same size as that of the image IM0 is obtained. The display image IM3 is the image for displaying or storing.

Figure 2:
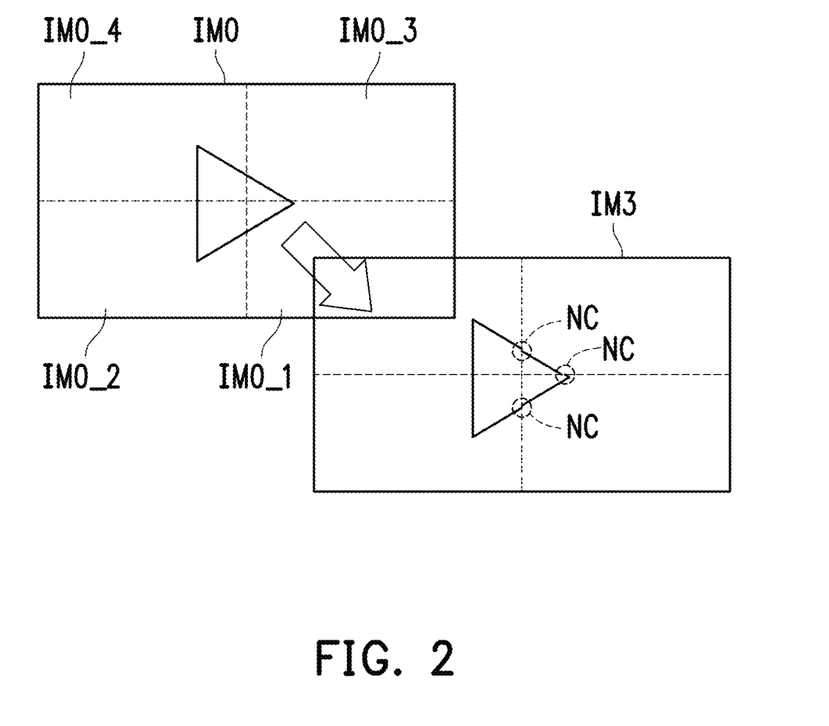
FIG. 2 is a schematic view showing images before and after image transmission.

For the purpose of improving image transmission efficiency, in the current technology, the image IM0 is cut into a plurality of partial images such as partial images IM0_1, IM0_2, IM0_3 and IM04 in FIG. 2, and the partial images IM0_1, IM0_2, IM0_3 and IM0_4 are simultaneously transmitted through different channels respectively. After receiving the partial images, the receiving apparatus then removes the distorted areas according to the method described in FIG. 1, and reassembles the images from which the distorted areas are removed to obtain the display image IM3. However, since the edges of the partial images are removed due to distortion, reassembling the partial images may easily result in picture discontinuities in the border areas, as shown by discontinuous images NC in FIG. 2. Therefore, how to improve the display quality of the transmitted image is indeed an issue that needs to be addressed in this field.

SUMMARY

Accordingly, the disclosure provides an image transmission method and a system thereof and an image transmission apparatus, which maintain the display quality of the image after the image is transmitted through a channel, and prevent the problem of picture discontinuities caused by the receiving apparatus that cuts off the image due to distortion.

An image transmission method in an embodiment of the disclosure is provided hereafter: an estimated distortion area of at least one first image is determined; the first image is zoomed out to generate a second image according to the estimated distortion area; the estimated distortion area is added around the second image to generate a transmission image and a transmission pattern is filled in the estimated distortion area of the transmission image, wherein a resolution of the transmission image is equal to that of the first image; and the transmission image is transmitted through at least one channel.

An embodiment of the disclosure provides an image transmission system that includes a transmission apparatus and a receiving apparatus. The transmission apparatus includes a first memory storing a plurality of first instructions and a first processor coupled to the first memory. The first processor is adapted to execute the plurality of first instructions to perform an image transmission method that is provided hereafter: an estimated distortion area of at least one first image is determined; the first image is zoomed out to generate a second image according to the estimated distortion area; the estimated distortion area is added around the second image to generate a transmission image and a transmission pattern is filled in the estimated distortion area of the transmission image, wherein a resolution of the transmission image is equal to that of the first image; and the transmission image is transmitted through at least one channel. The receiving apparatus is coupled to the transmission apparatus through the at least one channel, and includes a second memory storing a plurality of second instructions and a second processor coupled to the second memory. The second processor is adapted to execute the plurality of second instructions to perform the image transmission method that is provided hereafter: after the transmission image is obtained from the transmission apparatus, the second image is taken out from the transmission image; and the second image is zoomed in to serve as a display image.

An embodiment of the disclosure provides an image transmission apparatus that includes a first memory storing a plurality of instructions and a first processor coupled to the first memory. The first processor is adapted to execute the plurality of instructions to perform an image transmission method that is provided hereafter: an estimated distortion area of at least one first image is determined; the first image is zoomed out to generate a second image according to the estimated distortion area; the estimated distortion area is added around the second image to generate a transmission image and a transmission pattern is filled in the estimated distortion area of the transmission image, wherein a resolution of the transmission image is equal to that of the first image; and the transmission image is transmitted through at least one channel.

Based on the foregoing, the embodiments of the disclosure propose the image transmission method and the system thereof and the image transmission apparatus, in which the transmission apparatus determines in advance the estimated distortion area of the image to be transmitted, zooms out the image to avoid the estimated distortion area, and replaces the data of the original estimated distortion area with the transmission pattern. In this way, edge distortion caused by transmission is filled in by the transmission pattern and the image to be transmitted remains intact, thereby improving the display quality.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 3:
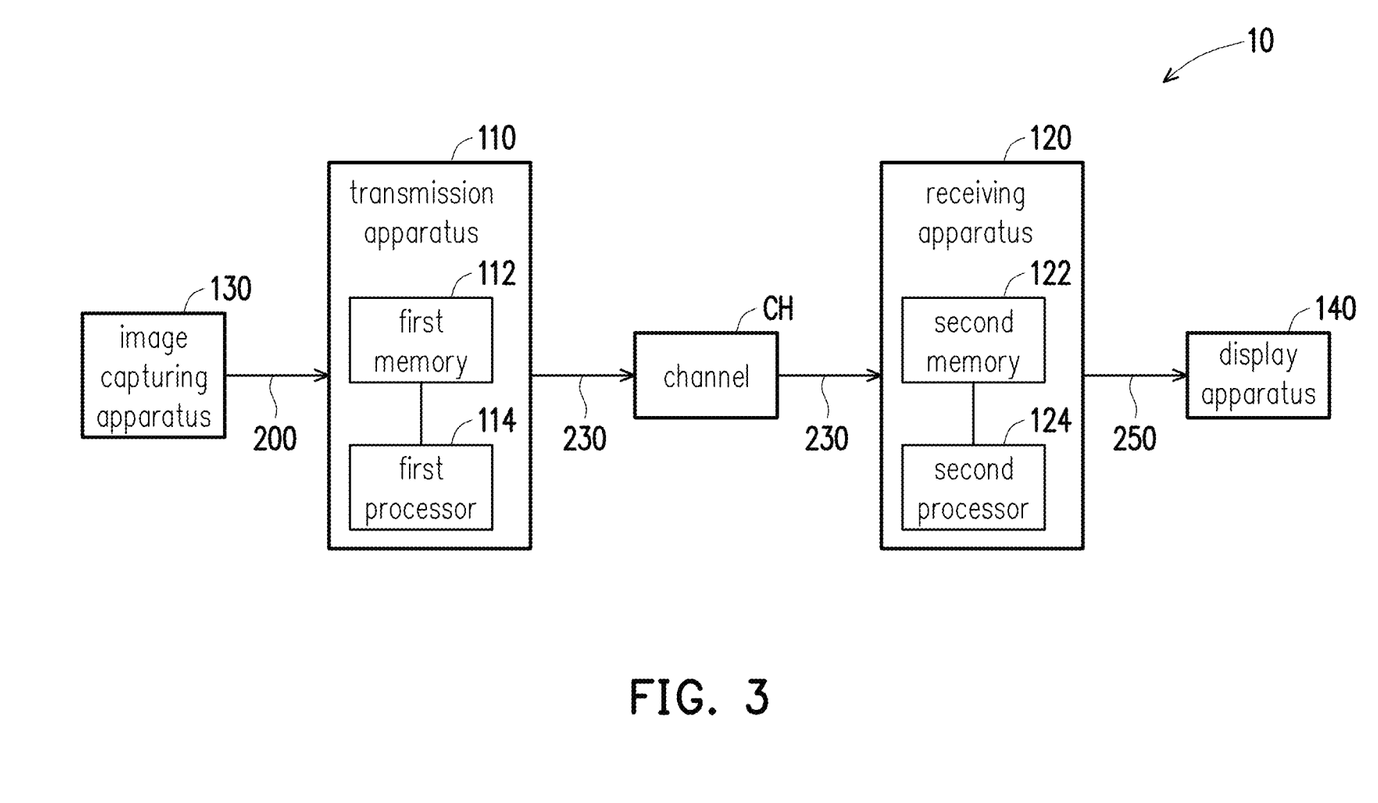
FIG. 3 is a block diagram of an image transmission system according to an embodiment of the disclosure.
Figure 4:
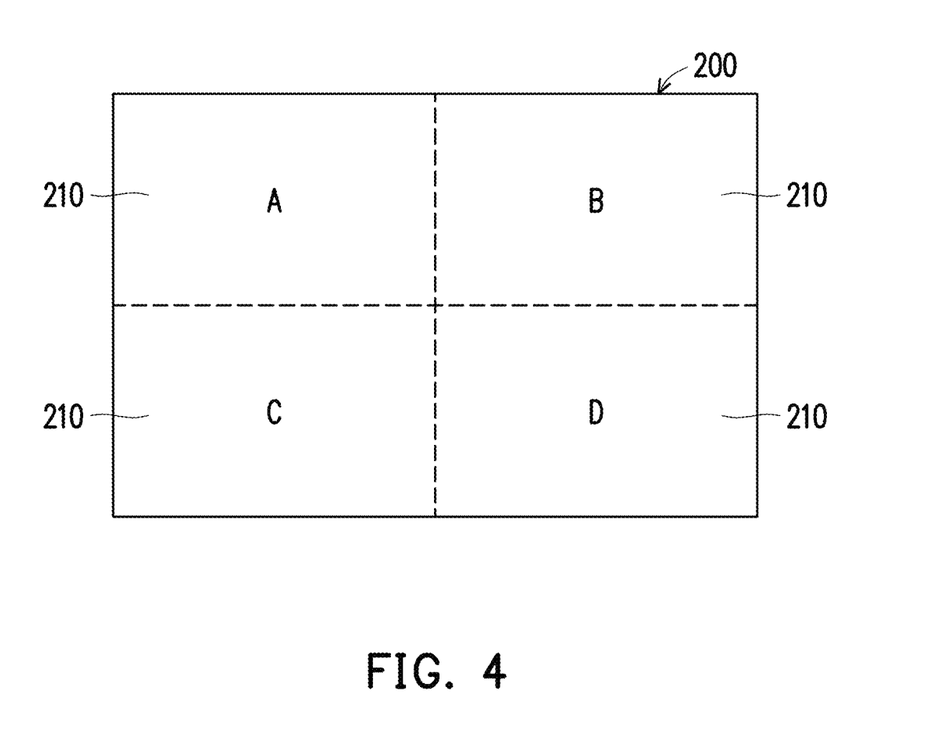
FIG. 4 is a schematic view showing an original image to be transmitted according to an embodiment of the disclosure.

FIG. 3 is a block diagram of an image transmission system according to an embodiment of the disclosure. FIG. 4 is a schematic view showing an original image to be transmitted according to an embodiment of the disclosure. With reference to FIG. 3 and FIG. 4, an image transmission system 10 includes a transmission apparatus 110 and a receiving apparatus 120. The transmission apparatus 110 is adapted to transmit an original image 200 to the receiving apparatus 120 through a channel CH. In this embodiment, the channel CH may be composed of four channels. Accordingly, the transmission apparatus 110 may cut the original image 200 into a plurality of first images 210 that have the same number as that of the channels (four partial images in this case), so that signals of a full-screen image may be transmitted to the four channels in real time. For example, as the display resolution of the original image 200 is 1280*960 pixels, the display resolution of the first image 210 is 640*480 pixels. Here, the first images 210 located at the upper left, upper right, lower left and lower right are respectively indicated by reference signs A, B, C and D.

In this embodiment, the image transmission system 10 further includes an image capturing apparatus 130 and a display apparatus 140. The image capturing apparatus 130 is coupled to the transmission apparatus 110 for providing the original image 200. The display apparatus 140 is coupled to the receiving apparatus 120 for displaying the received image. It should be noted that the image capturing apparatus 130 and the display apparatus 140 are not indispensable. In another embodiment, the image transmission system may not include the image capturing apparatus 130 and the display apparatus 140.

The transmission apparatus 110 includes a first memory 112 and a first processor 114 coupled to the first memory 112. The receiving apparatus 120 includes a second memory 122 storing a plurality of second instructions and a second processor 124 coupled to the second memory 122.

Specifically, the first memory 112 and the second memory 122 are each a stationary or movable random access memory (RAM) in any form, a read-only memory (ROM), a flash memory, a hard disc, another similar device, or a combination of the foregoing, for example, and are adapted to store a plurality of first instructions and a plurality of second instructions respectively.

The first processor 114 and the second processor 124 are each a central processing unit (CPU), a microprocessor, an application specific integrated circuit (ASIC), a programmable logic device (PLD), or another hardware device with computing capability, for example, and are adapted to receive first instructions and second instructions from the first memory 112 and the second memory 122 respectively to execute the image transmission system 10.

The channel CH may utilize a wired transmission medium such as an optical fiber, a cable or the like, and may also adopt wireless transmission techniques such as wireless fidelity (WiFi), Bluetooth or the like.

The image capturing apparatus 130 may be an image sensor such as a charge coupled device (CCD) image sensor or a camera and so on. However, the disclosure is not limited thereto.

The display apparatus 140 is a liquid crystal display (LCD), a light-emitting diode display (LED), a field emission display (FED), or another type of the display apparatus, for example.

Figure 5:
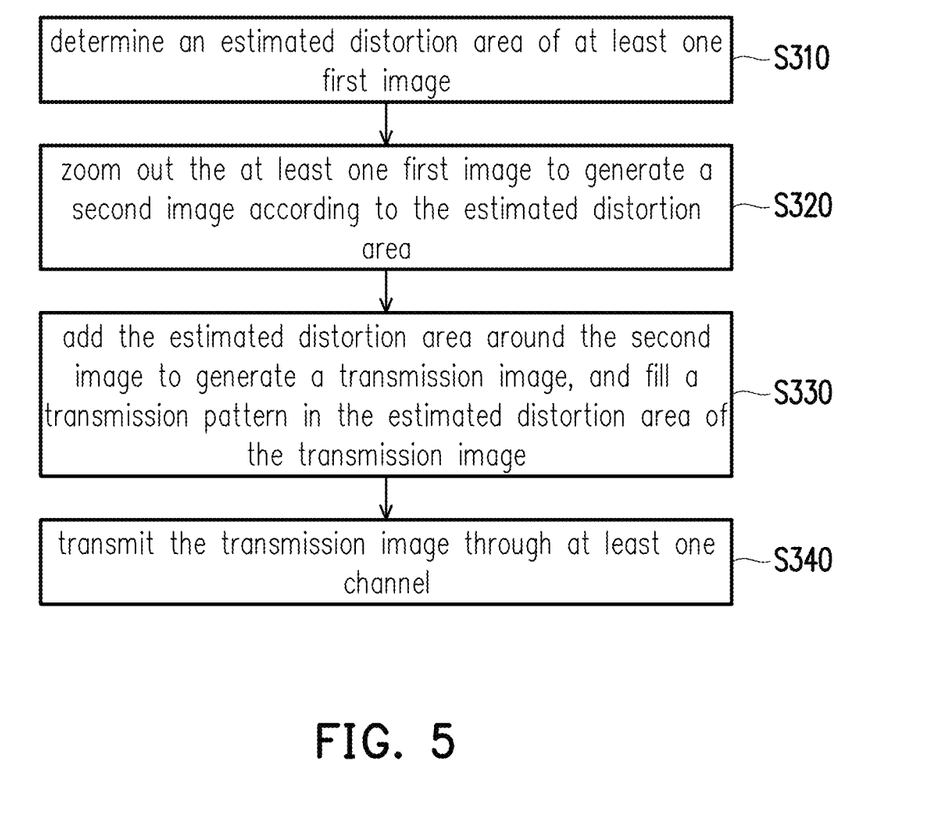
FIG. 5 is a flow chart illustrating an image transmission method according to an embodiment of the disclosure.

FIG. 5 is a flow chart illustrating an image transmission method according to an embodiment of the disclosure. The image transmission method of FIG. 5 is adapted for the image transmission system 10 of FIG. 1. Hereinafter, the image transmission method in this embodiment is described in details with reference to the respective components of the image transmission system 10.

Figure 6:
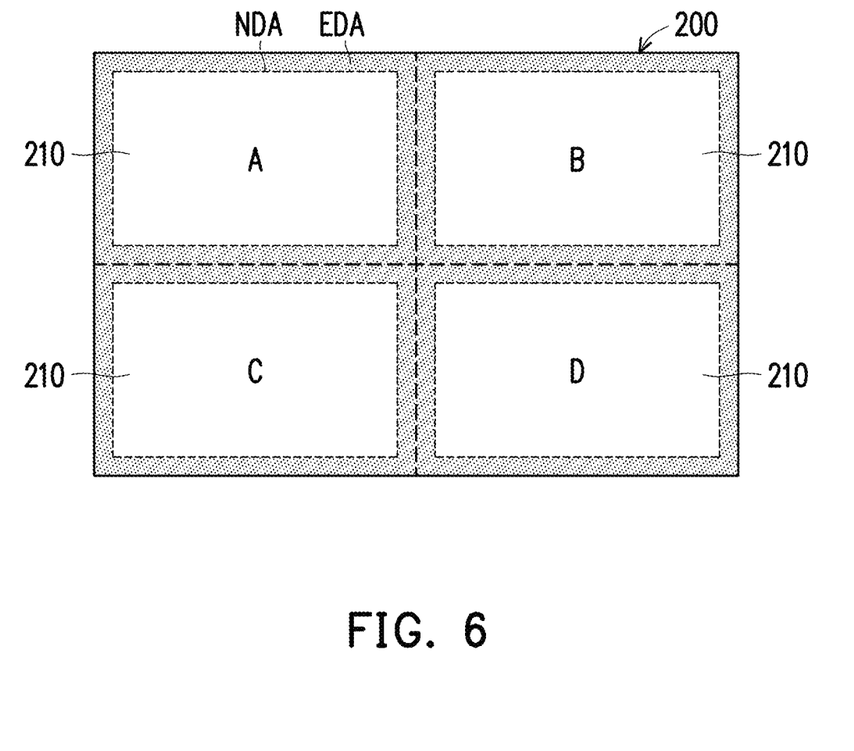
FIG. 6 is a schematic view showing a first image according to an embodiment of the disclosure.

FIG. 6 is a schematic view showing a first image according to an embodiment of the disclosure. With reference to FIG. 6, in step S310, the first processor 114 determines an estimated distortion area EDA of the first image 210. In one embodiment, before determining the estimated distortion area EDA of the first image 210, the transmission apparatus 110 may transmit a test image to the receiving apparatus 120 through the channel CH and determine the estimated distortion area EDA according to the transmission result. The area of the first image 210 surrounded by the estimated distortion area EDA is called an estimated non-distortion area NDA. For example, if the resolution of the first image 210 is 640*480 pixels and the estimated distortion area EDA ranges from the edge to five pixels away from the edge, then the estimated non-distortion area NDA is the area of 630*470 pixels in the middle of the first image 210.

It should be noted that the estimated distortion area EDA is not necessarily symmetrically distributed in the first image 210. In another embodiment, the estimated distortion area EDA may be asymmetrically distributed. For example, the estimated distortion area EDA consists of pixels of the first three rows and the last five rows and pixels of the first four columns and the last two columns. However, the disclosure is not limited thereto.

Figure 7:
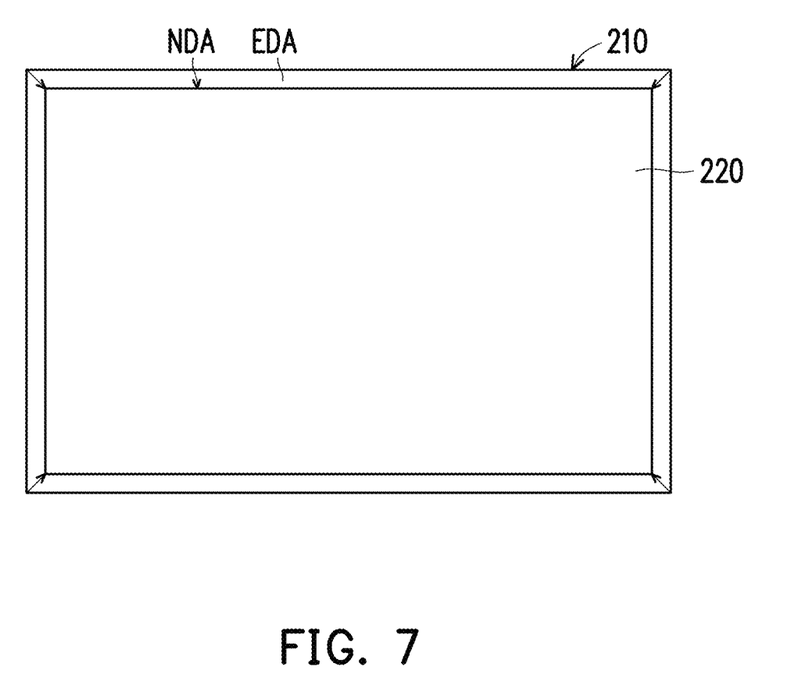
FIG. 7 is a schematic view showing a first image and a second image according to an embodiment of the disclosure.

FIG. 7 is a schematic view showing a first image and a second image according to an embodiment of the disclosure. With reference to FIG. 7, in step S320, the first processor 114 zooms out the first image 210 to generate a second image 220 according to the estimated distortion area EDA. Since transmission distortion is predicted to occur in the pixel data of the estimated distortion area EDA at the periphery of the first image 210, the first processor 114 zooms out the first image 210 to the size of the estimated non-distortion area NDA. That is, the size of the second image 220 is equal to the size of the first image 210 minus the size of the estimated distortion area EDA. For example, when the estimated distortion area EDA is set to range from the edge of the first image 210 to five pixels away from the edge, the first image 210 is reduced to 630*470 pixels in resolution to serve as the second image 220.

Figure 8:
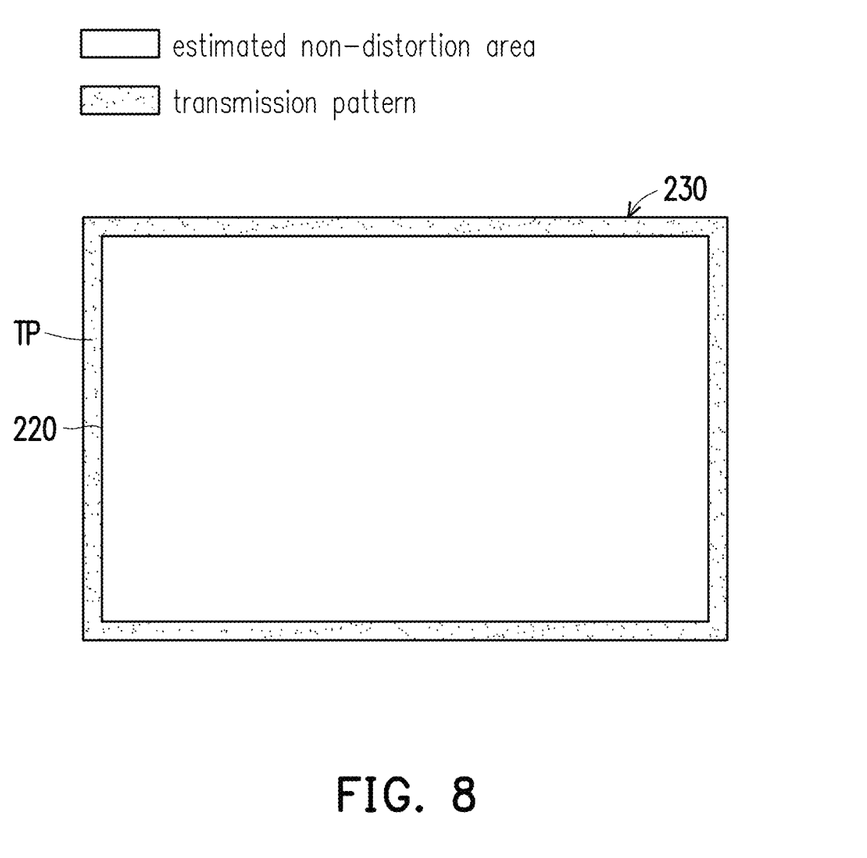
FIG. 8 is a schematic view showing a transmission image according to an embodiment of the disclosure.

FIG. 8 is a schematic view showing a transmission image according to an embodiment of the disclosure. With reference to FIG. 8, in step S330, the estimated distortion area EDA is added around the second image 220 to generate a transmission image 230, and a transmission pattern TP is filled in the estimated distortion area EDA of the transmission image 230. For example, the resolution of the second image 220 is 630*470 pixels, and the first processor 114 may add 5 pixels (the size of the estimated distortion area EDA) around the second image 220 to generate the transmission image 230 that has the resolution of 640*480, and may fill the transmission pattern TP in the added estimated distortion area EDA. In other words, the resolution of the transmission image 230 is equal to that of the first image 210.

The disclosure does not impose limitations on the form of the specific transmission pattern TP. For example, the transmission pattern TP may be one of a plurality of signals of different colors or a combination thereof, e.g., a combination of R, G and B signals representing different colors. Specifically, the transmission pattern TP in each row may be in the form of 10 pixels per cycle, with 5 consecutive R signals per cycle in the first row, 7 consecutive B signals per cycle in the second row and so on.

In step S340, the first processor 114 may transmit the transmission image 230 to the receiving apparatus 120 through the channel CH. After the receiving apparatus 120 obtains the transmission image 230, the second image 220 is taken out from the transmission image 230. Specifically, the second processor 124 cuts the transmission image 230 according to the estimated distortion area EDA to take out the second image 220.

Figure 9:
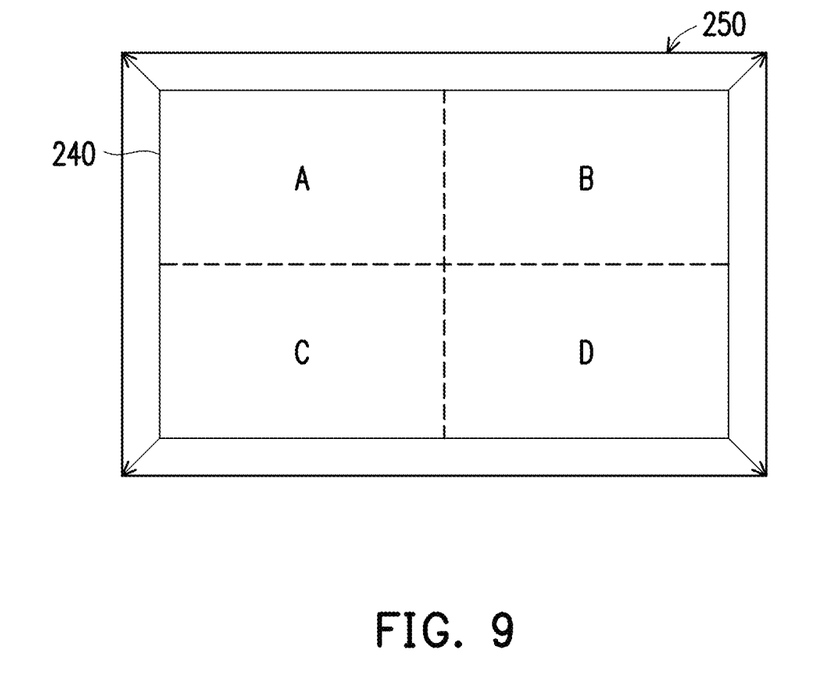
FIG. 9 is a schematic view showing a display image according to an embodiment of the disclosure.

FIG. 9 is a schematic view showing a display image according to an embodiment of the disclosure. With reference to FIG. 9, the second processor 124 may cut off the distorted image or cut the transmission pattern TP so as to take out the second image 220. In this embodiment, a plurality of second images 220 may also be reassembled to obtain a complete transmission picture 240. Since the second image 220 is the zoomed-out first image 210 and since the current resolution of the transmission picture 240 is 1260*940 pixels and smaller than that of the original image 200, the second processor 124 then zooms in the second image 220 to serve as a display image 250. For example, the resolution of the display image 250 is restored to be the same as that of the first image 210, i.e., 1280*960 pixels, and then the display image 250 is transmitted to the display apparatus 140 to display a picture.

In another embodiment, it may not be necessary for the transmission apparatus 110 to cut the original image 200 into a plurality of partial images. The transmission apparatus 110 may directly receive the first image 210 from the image capturing apparatus 130.

In summary of the foregoing, the image transmission method and the system thereof and the image transmission apparatus are proposed in the embodiments of the disclosure. As the size of the distortion area is estimated in advance, the image to be transmitted is zoomed out to a size that is not to be affected by the distortion, and the transmission pattern is filled in the estimated distortion area to protect the zoomed-out image to be transmitted and to test the condition of transmission distortion in the channel. In this way, the image distortion caused by channel transmission may be avoided, thereby improving the image transmission quality.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image transmission method, comprising:
    determining an estimated distortion area of at least one first image;
    zooming out the at least one first image to generate a second image according to the estimated distortion area;
    adding the estimated distortion area around the second image to generate a transmission image so that a resolution of the transmission image is equal to that of the at least one first image, and filling a transmission pattern in the estimated distortion area of the transmission image; and
    transmitting the transmission image through at least one channel.

2. The image transmission method as recited in claim 1, further comprising:
    before the estimated distortion area of the at least one first image is determined, transmitting a test image from a transmission apparatus to a receiving apparatus through the at least one channel so as to determine the estimated distortion area.

3. The image transmission method as recited in claim 1, wherein a size of the second image being equal to a size of the at least one first image minus a size of the estimated distortion area.

4. The image transmission method as recited in claim 1, further comprising:
    after the transmission image is obtained by a receiving apparatus, taking out the second image from the transmission image; and
    zooming in the second image to serve as a display image.

5. The image transmission method as recited in claim 4, wherein taking out the second image from the transmission image comprises:
    cutting the transmission image according to the estimated distortion area to take out the second image.

6. The image transmission method as recited in claim 1, wherein the transmission pattern is one of a plurality of signals of different colors or a combination thereof.

7. The image transmission method as recited in claim 1, wherein the at least one channel is more than one, and the at least one first image is also more than one and has the same number as that of the at least one channel, wherein the at least one first image that is more than one consists of partial images into which an original image is cut.

8. An image transmission system, comprising:
a transmission apparatus comprising:
  a first memory storing a plurality of first instructions; and
  a first processor coupled to the first memory for executing the plurality of first instructions to perform an image transmission method, the image transmission method comprising:
    determining an estimated distortion area of at least one first image;
    zooming out the at least one first image to generate a second image according to the estimated distortion area;
    adding the estimated distortion area around the second image to generate a transmission image so that a resolution of the transmission image is equal to that of the at least one first image, and filling a transmission pattern in the estimated distortion area of the transmission image; and
    transmitting the transmission image through at least one channel; and
a receiving apparatus coupled to the transmission apparatus through the at least one channel, the receiving apparatus comprising:
  a second memory storing a plurality of second instructions; and
  a second processor coupled to the second memory for executing the plurality of second instructions to perform the image transmission method, the image transmission method comprising:
    after the transmission image is obtained from the transmission apparatus, taking out the second image from the transmission image; and
    zooming in the second image to serve as a display image.

9. The image transmission system as recited in claim 8, wherein before determining the estimated distortion area of the at least one first image, the transmission apparatus transmits a test image to the receiving apparatus through the at least one channel so as to determine the estimated distortion area.

10. The image transmission system as recited in claim 8, wherein the second processor cuts the transmission image according to the estimated distortion area to take out the second image.

11. The image transmission system as recited in claim 8, wherein the transmission pattern is one of a plurality of signals of different colors or a combination thereof.

12. The image transmission system as recited in claim 8, wherein the at least one channel is more than one, and the at least one first image is also more than one and has the same number as that of the at least one channel, wherein the at least one first image that is more than one consists of partial images into which an original image is cut.

13. The image transmission system as recited in claim 12, further comprising:
  an image capturing apparatus coupled to the transmission apparatus for providing the original image;
  a display apparatus coupled to the receiving apparatus for displaying the display image.

14. An image transmission apparatus, comprising:
a first memory storing a plurality of instructions; and
a first processor coupled to the first memory for executing the plurality of instructions to perform an image transmission method, the image transmission method comprising:
  determining an estimated distortion area of at least one first image;
  zooming out the at least one first image to generate a second image according to the estimated distortion area;
  adding the estimated distortion area around the second image to generate a transmission image so that a resolution of the transmission image is equal to that of the at least one first image, and filling a transmission patter in the estimated distortion area of the transmission image; and
  transmitting the transmission image through at least one channel.

* * * * *